United States Patent [19]
Ruppert et al.

[11] Patent Number: 5,788,730
[45] Date of Patent: Aug. 4, 1998

[54] PROCESS AND APPARATUS FOR THE PRODUCTION OF A QUARTZ GLASS BLANK

[75] Inventors: Klaus Ruppert, Maintal; Anton Steinkohl, Grüñdau, both of Germany

[73] Assignee: Heraeus Quarzglas GmbH, Hanau, Germany

[21] Appl. No.: 677,933

[22] Filed: Jul. 10, 1996

[30] Foreign Application Priority Data

Jul. 27, 1995 [DE] Germany ............... 195 27 451.2

[51] Int. Cl.[6] ................................................ G03B 20/00
[52] U.S. Cl. ....................................... 65/17.4; 65/414
[58] Field of Search ................................. 65/17.4, 414

[56] References Cited

U.S. PATENT DOCUMENTS

| | | | |
|---|---|---|---|
| 4,406,680 | 9/1983 | Edahiro et al. | 65/416 |
| 4,618,354 | 10/1986 | Suda et al. | 65/2 |
| 4,804,247 | 2/1989 | Kyoto et al. | 385/142 |
| 5,221,309 | 6/1993 | Kyoto et al. | 65/416 |
| 5,366,531 | 11/1994 | Koide et al. | 65/415 |
| 5,599,371 | 12/1994 | Cain et al. | 65/413 |

FOREIGN PATENT DOCUMENTS

| | | |
|---|---|---|
| 0146659 | 7/1985 | European Pat. Off. . |
| 237183 | 9/1987 | European Pat. Off. . |
| 2333628 | 7/1977 | France . |
| 55-023068 | 2/1980 | Japan . |
| 55-080732 | 6/1980 | Japan . |
| 55-144433 | 11/1980 | Japan . |
| 59-232934 | 2/1985 | Japan . |

*Primary Examiner*—Stanley S. Silverman
*Assistant Examiner*—Sean Vincent
*Attorney, Agent, or Firm*—Felfe & Lynch

[57] ABSTRACT

A silicon-containing glass starting material is fed through a central area of a multi-nozzle burner head while the fuel gases are fed through an outer area surrounding the center. In a reaction zone near the burner head, fine $SiO_2$ soot particles are formed, which are deposited on a carrier to build up a porous soot body, which is then sintered. During the process of building up the soot body, the fuel gas stream is varied to achieve a desired radial or axial density profile in the soot body. To separate the glass starting material from the fuel gas in the area extending from the burner head to the reaction zone, a barrier gas stream is provided between the burner gas stream and the stream of glass starting material. The burner head has a central, tubular nozzle and several ring nozzles arranged coaxially around it. Between the central nozzle and the ring nozzles, a ring-shaped barrier gas nozzle is provided, which has inner and outer boundary walls which are circular in radial cross section. At least the outer boundary wall slants toward the central nozzle in an area extending from underneath the nozzle orifice to a point level with the nozzle orifice.

14 Claims, 1 Drawing Sheet

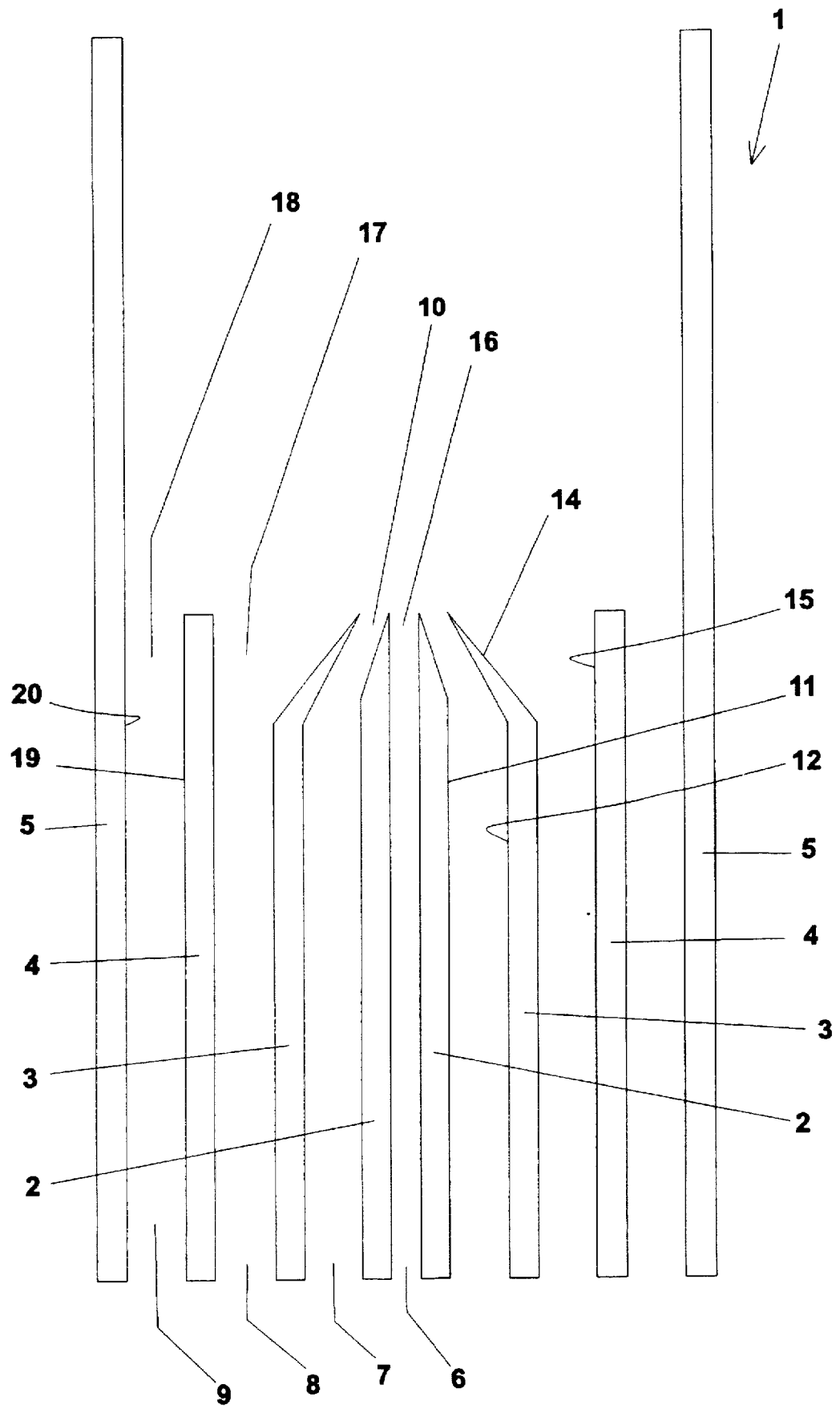

PROCESS AND APPARATUS FOR THE PRODUCTION OF A QUARTZ GLASS BLANK

BACKGROUND OF THE INVENTION

The invention pertains to a process for the production of a quartz glass blank by the reaction of a gaseous, silicon-containing glass starting material in a fuel gas flame to form $SiO_2$ by the use of a multi-nozzle burner head, through the central area of which the glass starting material is conducted. The fuel gas is supplied from an outer area surrounding the center, and fine $SiO_2$ soot particles are formed in a reaction zone near the burner head. These particles are deposited onto a carrier to form a porous soot body, which is then sintered.

A process of this type is described in European Patent Application EP-A1 0 146 659. Here fine $SiO_2$ soot particles are deposited on a horizontally oriented graphite rod, which is rotated around its long, horizontal axis. The soot particles are formed from organic silicon-containing compounds by flame hydrolysis in an oxygen-hydrogen flame. In an exemplary embodiment, the silicon-containing organic compound is fed for this purpose together with a doping agent and fluorine as well as argon and oxygen to the central nozzle of a multi-nozzle burner head. The central nozzle is surrounded by several ring nozzles arranged coaxially to the central nozzle. An argon-oxygen gas mixture is fed through the first ring nozzle, and the fuel gases hydrogen and oxygen are supplied through the second and third nozzles.

The $SiO_2$ soot particles are formed in a reaction zone a certain distance away from the burner head. The beginning of the reaction zone can be easily identified by the change in the color of the flame from blue to white. The distance between the reaction zone and the mouth of the burner depends primarily on the flow rates of the gases emerging from the burner head and on the temperature of the flame. If the distance is too short, $SiO_2$ soot particles are deposited on the burner mouth and thus clog up the nozzle orifices. On the other hand, to ensure the most complete possible reaction of the glass starting material, this material must react for a certain minimum length of time and thus spend a certain minimum length of time in the reaction zone. This means that the distance between the beginning of the reaction zone and the surface of the soot body being formed must also be of sufficient length. The efficiency of the deposition process is optimum when the length of the reaction zone is selected so that the glass starting material has reacted completely by the time it reaches a point near the surface of the soot body.

Normally, the distance between the burner head and the surface of the soot body being formed is kept constant, and the burner head is moved away at the same rate that the diameter of the soot body increases.

As the surface of the soot body increases, the loss of heat by thermal radiation and the amount of heat lost by convection also increase. A soot body with a large volume thus cools faster than soot bodies with smaller volumes. As a result, the density of the soot body decreases in the radial direction from the inside toward the outside. This can have disadvantageous effects on the suitability of the soot body for the production of optical components such as optical fibers for communications technology, for example. It would be possible to prevent the temperature from dropping by decreasing the distance between the burner and the soot body, but the efficiency of the deposition process would suffer for the reasons explained above.

SUMMARY OF THE INVENTION

The object of the present invention is to provide a process by means of which the density profile within the soot body can be optimized without reducing the efficiency of the deposition process.

In addition, the invention pertains to an apparatus with a burner head, which has a central, tubular central nozzle for the feed of glass starting material, and several ring-shaped nozzles for the feed of the fuel gases arranged coaxially around the central nozzle. A ring-shaped barrier gas nozzle, which has inner and outer boundary walls which are circular in radial cross section is provided between the central nozzle and the ring nozzles.

A device such as this is also known from EP-A1 0 146 659. The known burner consists of quartz glass. It has a tubular central nozzle for the feed of glass starting material and three ring nozzles arranged coaxially to the central nozzle. The two outer ring nozzles are provided to feed the oxygen and the hydrogen for the fuel gas flame. Between the ring-shaped fuel gas nozzles and the central nozzle there is an additional ring-shaped nozzle, which serves to feed an oxygen-argon mixture.

High deposition rates can be achieved once the gas streams of the known burner have been adjusted optimally. However, the burner reacts sensitively to changes in the flow conditions, and under these conditions the deposition rate drops.

An additional object of the invention is to provide an apparatus for the production of a quartz glass blank by the reaction of a gaseous, silicon-containing glass starting material, which apparatus not only ensures a high conversion rate but also is relatively insensitive to changes in the process parameters.

According to the invention, the fuel gas stream is varied to achieve a desired radial or axial density profile of the soot body during the formation of the soot body. To keep the glass starting material separate from the fuel gas in the area extending from the burner head to the reaction zone, a barrier gas stream is provided between the fuel gas stream and the stream of glass starting material.

The inventors conducted extensive experiments with the goal of producing soot bodies with specific types of radial density profiles; normally, it is desired to produce a density profile in which density remains constant across the wall thickness of the soot body. The first attempt consisted in trying to compensate for the increase in the cooling rate of the soot body as it grows larger by moving the burner or burners closer to the surface of the soot body. As a result, the length of the reaction zone was reduced; the complete oxidation of the gaseous glass starting material was prevented; and both the degree of conversion and the deposition rate were thus reduced.

An attempt was also made to keep the same distance between the surface of the soot body and the burner or several burners as the diameter of the body increased but to increase the flow rate of the burner gas stream to maintain a sufficiently high temperature during the course of the soot body deposition process. Because of the higher flow velocities of the fuel gases required in this case, the beginning of the reaction zone was shifted toward the surface of the soot body, and therefore the length of the reaction zone was reduced in this case as well, and the conversion and deposition rate were decreased.

In further experiments, the surprising discovery was made that the fuel gas stream or streams can be varied over a wide range without displacing or reducing the reaction zone if a barrier gas stream is provided between the fuel gas stream and the stream of the glass starting material. The barrier gas stream thus makes the position and the length of the reaction zone largely independent of the type and amount of fuel gases.

One of the functions of the barrier gas stream is to stabilize the length and the position of the reaction zone, and to accomplish this, it is necessary to prevent the glass starting material from reacting prematurely with the fuel gases in the area of the burner head and to shift this reaction into the area of the reaction zone. The flow velocity of the barrier gas stream must therefore be selected so that it completely shields the stream of glass starting material from the fuel gas stream or streams in the area near the burner head. As a result, it is possible to vary the fuel gas stream or streams without the stream of glass starting material being noticeably affected thereby. So that the barrier gas stream can function in this way, its flow velocity must be set sufficiently high. The required flow velocity depends on the other gas streams, but it can be easily determined by the expert in the field on the basis of a few experiments. The distance between the reaction zone and the burner mouth can serve to indicate when the flow velocity is high enough. To prevent the barrier gas stream from mixing prematurely with the fuel gases, this distance should be at least 3 mm; a distance of 5 mm is even better. The barrier gas stream can be supplied through one or more burner nozzles.

The invention proceeds in two steps. First, the optimum length of the reaction zone for the glass starting material, fuel gases, and gas streams in question is determined. Second, the fuel gases are adjusted during deposition of the soot in such a way that the desired temperature is achieved on the surface of the soot body and thus the desired radial density profile is obtained within the soot body.

The term "reaction zone" is to be understood here as the area between the burner head and the surface of the soot body in which the gaseous glass starting material undergoes oxidation, the beginning of which is characterized by the change in the color of the burner flame from blue to white. Depending on the deposition process, the "surface of the soot body" will be either the lateral surface of a cylinder (OVD process) or the end surface of a cylinder (VAD process).

The fuel gases make available the energy for the conversion of the gaseous glass starting material into $SiO_2$ soot particles. The fuel gases will usually be hydrogen and oxygen, which are supplied to the reaction zone through two spatially separated nozzles.

A process has been found to be especially advantageous in which the fuel gas streams emerge in a turbulent manner from at least one of the fuel gas nozzles. A laminar or only slightly turbulent barrier gas stream is not affected at all by the turbulence of the fuel gas stream and can even be stabilized by it.

It is advantageous for the barrier gas stream to be focused within the burner head toward the reaction zone. This focusing can be achieved by suitably directing the flow of the barrier gas stream in the area of the burner mouth. For example, the boundary walls of the nozzle can be slanted inward and/or they can taper down conically toward the outside. Focusing the barrier gas stream has the effect of stabilizing its feed and of preventing the barrier gas stream from mixing prematurely with the fuel gases, thus preventing in turn the glass starting materials from reacting with the fuel gases, especially with hydrogen and oxygen, in the area of the burner head. Focusing the barrier gas also helps to stabilize all of the gas streams overall and thus facilitates the maintenance of the position and length of the reaction zone. As a result, the energy of the fuel gas stream also becomes more concentrated, and the loss of reaction heat by radiation toward the sides is reduced.

The fuel gas stream is preferably increased continuously during the buildup of the soot body. As a result of the continuous increase in the fuel gas stream, the relative temperature drop of the soot body with increasing thickness can be compensated. It is thus possible to arrive at a constant radial density within the soot body. The process according to the invention ensures that the efficiency of the deposition of the soot particles is not impaired when this is done.

$SiCl_4$ has turned out to be especially suitable as a glass starting material. It is advantageous to mix oxygen as a carrier gas into the glass starting material. The addition of a carrier gas offers the advantage that changes in the amount of $SiCl_4$ in the gas stream can be compensated by a corresponding change in the amount of carrier gas, and the flow velocity of the gas stream can therefore be kept constant overall. The oxygen reacts in the reaction zone with the glass starting material to form $SiO_2$. A method has proved advantageous in which the glass starting material emerges from the burner head through a central, tubular nozzle, and the barrier gas emerges through a ring nozzle concentric to the central nozzle. As a result, the barrier gas stream completely surrounds the stream of the glass starting material and guarantees the complete separation of the glass starting material from the fuel gas stream in the area of the burner head.

It has been found advantageous to keep the stream of glass starting material constant during the buildup of the soot body. This makes it easier to maintain a constant deposition rate and a constant density.

It is also helpful in this regard to keep the distance between the burner head and the surface of the forming soot body and the distance between the reaction zone and the surface of the forming soot body constant throughout the buildup of the soot body.

The beginning of the reaction zone is preferably adjusted to a value in the range of 5–10 mm from the burner head. The minimum distance of 5 mm prevents soot particles from being deposited onto the burner head. At a distance of more than 10 mm, the length of the reaction zone is reduced unnecessarily.

With respect to the apparatus, the barrier gas nozzle extends at an angle toward the central nozzle in an area extending from underneath the nozzle orifice to a point level with the nozzle orifice.

The barrier gas nozzle is used to supply a barrier gas, which separates the stream of glass starting material from the fuel gas stream, regardless of how fast the fuel gas stream may be traveling. Because the barrier gas nozzle extends at a slant toward the central axis in an area extending from under- neath the nozzle orifice to a point level with the nozzle orifice, the stream of barrier gas is focused and stabilized, and thus the stream of glass starting material is shielded more effectively from the fuel gases. The guidance of the barrier gas stream stabilizes the gas streams in the area of the burner head overall, which is particularly evident at very high and very low fuel gas flow rates. As a result, it is easier to control the deposition of the soot particles and easier to arrive at the desired density profile.

The barrier gas nozzle preferably tapers down conically in an area extending from underneath the nozzle orifice to a point level with the nozzle orifice. The conical tapering of the barrier gas nozzle in the area of the nozzle orifice has the effect of focusing the barrier gas stream toward the area of the reaction zone, as already explained above on the basis of the description of the process.

With respect to the stability of the barrier gas stream, it is especially advantageous to design at least one fuel gas nozzle as a diffusor. The diffusor can be based on the design principles generally known in the field of fluidics. The essential point is that, as a result of its design, the nozzle in question produces a turbulent stream of fuel gas, which has little or no effect on the barrier gas stream.

Preferably, an inner, ring-shaped fuel gas nozzle with an orifice cross section expands from a point underneath the nozzle orifice to a point level with the nozzle orifice. As a result of this expansion, the nozzle acts as a diffusor, so that the degree of turbulence of the fuel gas stream emerging from the fuel gas nozzle increases quickly in the area front of the nozzle orifice. This guarantees that the barrier gas stream emerging from a point further down in the burner head experiences only slight interference.

In a preferred embodiment of the apparatus, an outer, ring-shaped fuel gas nozzle with inner and outer boundary walls is provided, where the outer boundary wall projects outward from the nozzle orifice beyond the inner boundary wall. This extension of the outer boundary wall also serves to improve the guidance of the gas. It prevents the gas streams, especially the fuel gas streams, from widening and defocusing prematurely. The energy of the fuel gases becomes more concentrated, and the loss of reaction heat by radiation toward the sides is reduced. This increases the efficiency of the deposition process.

BRIEF DESCRIPTION OF THE DRAWING

The sole figure is a longitudinal cross section of the mouth of a burner according to the invention.

DETAILED DESCRIPTION OF THE PREFERRED EMBODIMENT

The burner mouth 1 has a total of 4 burner pipes 2, 3, 4, 5 of quartz glass, arranged coaxially to each other. Central burner pipe 2 encloses a central nozzle 6. Barrier gas nozzle 7 is between central burner pipe 2 and adjacent burner pipe 3; burner pipe 3 and burner pipe 4 enclose ring nozzle 8, and burner pipe 4 and outside pipe 5 enclose outside nozzle 9.

In the area of nozzle orifice 10, ring-shaped barrier gas nozzle 7 slants toward central nozzle 6. At the same time, the open cross section of the nozzle in this area tapers down continuously. This is achieved in that both inner boundary wall 11 and outer boundary wall 12 of barrier gas nozzle 7 bend at an obtuse angle toward central nozzle 6 in the area of nozzle orifice 10. This angle is steeper in the case of outer boundary wall 12 than in the case of inner boundary wall 11.

The open cross section of ring nozzle 8 expands in the area of nozzle orifice 17. Inner boundary wall 14 slants toward central nozzle 6, proceeding continuously away from outer boundary wall 15 in the direction toward nozzle orifice 17.

Outside pipe 5 extends out beyond the area of nozzle orifices 10, 16, 17, 18. The orifice 18 is bounded by an inner boundary wall 19 and an outer boundary wall 20.

In the exemplary embodiment illustrated here, the maximum open cross sections of central nozzle 6, barrier gas nozzle 7, ring nozzle 8, and outside nozzle 9 have, in the order given, the following ratios to each other: 1:1.5:30:2.

In the following, the process according to the invention is explained in greater detail on the basis of the exemplary embodiment illustrated in the figure.

$SiCl_4$ and oxygen are conducted through central nozzle 6, oxygen through barrier gas nozzle 7, hydrogen through ring nozzle 8, and oxygen through out-side nozzle 9. The flow rates of the gas streams have the following ratios to each other, in the order cited: 0.7:0.7:10:3.

The oxygen barrier gas stream conducted through barrier gas nozzle 7 is calculated so that it is just sufficient to prevent $SiO_2$ from being deposited on nozzle orifices 10, 16. For this purpose, it is adjusted with respect to the Si-containing gas steam emerging from central nozzle 6 in such a way that the conversion of $SiCl_4$ to $SiO_2$ begins about 7 mm from nozzle orifices 10, 16. This is the point where the reaction zone begins and from which the zone extends toward the deposition surface on a carrier (not shown in the figure). This method of guiding the gases guarantees that the conversion of $SiCl_4$ to $SiO_2$ begins as soon as possible after the gases emerge from the nozzle orifices 10, 16 and that the reaction zone is therefore as long as possible.

The special way in which the gas is guided by the conical outlet of nozzle orifice 10 of barrier gas nozzle 7 helps to achieve the desired result. The focusing of the barrier gas stream means that the fuel gas streams emerging from nozzle orifices 17, 18 are shielded very effectively from the Si-containing gas stream. The shielding is also improved by the expansion of ring nozzle 8 in the area of nozzle orifice 17. This area acts as a so-called "diffusor", as it is known in the field of fluidics. This means that the hydrogen gas stream introduced through ring nozzle 8 becomes turbulent in the upper area 17 of ring nozzle 8 and thus exerts practically no negative effect at all on the focussed barrier gas stream or on the shielding function.

The design of outside nozzle 9 also helps to shield the fuel gas stream. The oxygen gas stream introduced through outside nozzle 9 also becomes turbulent in the area of nozzle orifice 18. Thus it mixes ideally with the hydrogen gas stream emerging from ring nozzle 8, but it is unable to have any effect on the focussed barrier gas stream conducted through barrier gas nozzle 7. Because the gases are guided in this way, the glass starting material introduced through central nozzle 6 is shielded optimally from the fuel gases introduced through ring nozzle 8 and outside nozzle 9. This means that fuel gases can be varied within a certain range without causing any change in the stream of glass starting material or displacing the beginning or position of the reaction zone. As a result, it is possible to vary the fuel gas stream during the course of the soot deposition process on a carrier body in such a way that, for example, the temperature created by the fuel gas increases continuously. Thus the density of the soot body being built up during the deposition process can be varied or, in the normal case, kept constant.

What is claimed is:

1. Process for producing a quartz glass blank comprising
   providing a multi-nozzle burner he ad having a central nozzle and a fuel gas nozzle arranged concentrically around said central nozzle,
   introducing glass starting material through said central nozzle,
   introducing a fuel gas stream through said fuel gas nozzle in order to build up a body of quartz glass soot in a reaction zone in front of the central nozzle, said fuel gas stream being introduced at a rate which is varied to achieve a desired density profile of the body, and
   introducing a barrier gas between the central nozzle and the reaction zone, and
   wherein said fuel gas is introduced at a rate which increases continuously during build-up of said body of quartz soot.

2. Process as in claim 1 wherein said fuel gas nozzle comprises means for inducing turbulence of said fuel gas introduced through said fuel gas nozzle.

3. Process as in claim 1 wherein said barrier gas nozzle comprises means for directing said barrier gas toward said reaction zone.

4. Process as in claim 1 wherein said barrier gas contains at least one of oxygen, argon, and nitrogen.

5. Process as in claim 1 wherein said starting material comprises $SiCl_4$.

6. Process as in claim 1 wherein said burner head further comprises a ring-shaped barrier gas nozzle arranged concentrically between said central nozzle and said fuel gas nozzle.

7. Process as in claim 1 wherein said starting material is introduced at a constant rate during build-up of said body of quartz glass soot.

8. Process as in claim 1 wherein said barrier gas is introduced at a constant rate during build-up of said body of quartz glass soot.

9. Process as in claim 1 wherein said burner head and said body are maintained at a constant distance during build-up of said body.

10. Process as in claim 1 wherein said reaction zone and said body are maintained at a constant distance during build-up of said body.

11. Process as in claim 1 wherein said reaction zone and said burner head are separated by a distance of 5–10 mm during build-up of said body.

12. Apparatus for building up a body of quartz glass soot, said apparatus comprising a tubular central nozzle having an orifice for introducing a glass starting material, a ring-shaped barrier gas nozzle concentrically surrounding said central nozzle, said barrier gas nozzle having an outer boundary wall which converges toward the orifice of the central nozzle, and ring-shaped fuel gas nozzles each having an orifice concentrically surrounding said barrier gas nozzle.

13. Apparatus as in claim 12 wherein at least one of said fuel gas nozzles has a cross section which expands toward the orifice of said at least one of said gas nozzles.

14. Apparatus as in claim 13 wherein said fuel gas nozzles comprise a ring-shaped outer nozzle concentrically surrounding an inner fuel gas nozzle, said outer nozzle having an inner boundary wall and an outer boundary wall extending beyond said inner boundary wall.

\* \* \* \* \*